US006103336A

United States Patent [19]

Swiszcz

[11] Patent Number: 6,103,336

[45] Date of Patent: Aug. 15, 2000

[54] LAMINATE HONEYCOMB MATERIAL

[75] Inventor: Paul G. Swiszcz, Boulder, Colo.

[73] Assignee: Hunter Douglas Inc., Upper Saddle River, N.J.

[21] Appl. No.: 09/014,460

[22] Filed: Jan. 28, 1998

[51] Int. Cl.[7] .......... B32B 3/12

[52] U.S. Cl. .......... 428/116; 428/12; 428/118; 160/84.01; 160/84.05

[58] Field of Search .......... 428/116, 12, 73, 428/181, 152, 118, 212, 215, 213, 72; 52/793.1; 160/84.01, 84.05

[56] References Cited

U.S. PATENT DOCUMENTS

| | | | |
|---|---|---|---|
| Re. 30,254 | 4/1980 | Rasmussen | 428/12 X |
| 4,019,554 | 4/1977 | Rasmussen | 428/116 |
| 4,450,027 | 5/1984 | Colson | 428/116 X |
| 4,603,072 | 7/1986 | Colson | 428/116 |
| 4,622,255 | 11/1986 | Anderson | 428/116 |
| 4,631,108 | 12/1986 | Colson | 156/461 |
| 4,631,217 | 12/1986 | Anderson | 428/118 |
| 4,673,600 | 6/1987 | Anderson | 428/116 X |
| 4,676,855 | 6/1987 | Anderson | 156/197 X |
| 4,677,012 | 6/1987 | Anderson | 428/116 |
| 4,685,986 | 8/1987 | Anderson | 156/197 |
| 4,795,515 | 1/1989 | Kao et al. | 156/197 |
| 4,871,006 | 10/1989 | Kao et al. | 428/116 X |
| 5,228,936 | 7/1993 | Goodhue | 156/197 X |
| 5,482,750 | 1/1996 | Colson et al. | 428/116 X |
| B1 5,228,936 | 6/1996 | Goodhue | 156/260 |

*Primary Examiner*—Deborah Jones
*Assistant Examiner*—Abraham Bahta
*Attorney, Agent, or Firm*—Dorsey & Whitney LLP

[57] ABSTRACT

A colinear laminate honeycomb panel permits the use of two or more different materials to form a single panel. In this manner, a retractable cover for an architectural opening may be formed that has a different appearance depending upon which side of the panel is being viewed. The resultant panel is formed by attaching a plurality of elongated precursor tubular cells, wherein each precursor tubular cell itself comprises at least two strips of material held in proximity to one another by a common carrier strip.

22 Claims, 6 Drawing Sheets

LAMINATE HONEYCOMB MATERIAL

BACKGROUND OF THE INVENTION a. Field of the Invention

The instant invention is directed toward a retractable cover for an architectural opening. More specifically, it relates to a cellular panel used to cover an architectural opening and a method of making the same.

b. Background Art

It is well known that cellular panels provide excellent coverings for architectural openings. For example, U.S. Pat. No. 5,482,750 to Colson et al. discloses a multi-cellular honeycomb insulating panel. Another type of retractable cellular panel is disclosed in U.S. Pat. No. 4,603,072 to Colson, the disclosure of which is hereby incorporated by reference.

A related type of honeycomb insulating panel is disclosed in U.S. Pat. No. 4,677,012 to Anderson. In the '012 patent, a cell of the panel is formed by folding a strip of material along longitudinally extending fold lines that bring the longitudinally extending edges of the material near each other. Then, a second length of material is secured to the longitudinally extending edges to form a cell. A plurality of these cells are then affixed together to form a panel. Another related type of honeycomb insulating panel is disclosed in U.S. Pat. Nos. 4,795,515 and 4,871,006 to Kao et al. The '515 patent is directed toward a process and machine for forming the honeycomb panel disclosed therein. According to the '515 patent, a plurality of attaching strips join pleat lines formed in each of the two sheets that comprise the front and rear surfaces of the completed panel. The '006 patent is directed toward a dual fluted shade. Again, in the '006 patent, a plurality of attaching strips join two sheets of fabric along corresponding pleat lines formed in each of the two sheets. Other panels, like those disclosed in the '515 and '006 patents, wherein strips connect adjacent sheets of fabric, are disclosed in U.S. Pat. No. 5,228,936 (and B1 U.S. Pat. No. 5,228,936) to Goodhue and U.S. Pat. No. 4,673,600 to Anderson. The '600 patent also discloses a panel wherein the two sheets of material forming the front and back faces are joined directly together. The application that issued as the '600 patent was a division of application Ser. No. 796,035, which eventually issued as U.S. Pat. No. 4,622,255 to Anderson. U.S. Pat. No. 4,685,986 to Anderson also issued from an application that was a division of the '035 application. Whereas the '600 patent claims the honeycomb panel, the '986 patent claims a method of fabricating the panel.

Still another related type of honeycomb panel is disclosed in U.S. Pat. No. 4,631,217 to Anderson. In the panel disclosed in the '217 patent, strips of material are folded into Z-configurations, which are then stacked in layers that are adhered together. U.S. Pat. No. 4,676,855 to Anderson issued from an application that was a division of the application that issued as the '217 patent. Whereas the '217 patent claims the honeycomb panel, the '855 patent claims a method of fabricating the panel.

U.S. Pat. No. 4,019,554 and its corresponding reissue U.S. Pat. No. Re. 30,254 to Rasmussen disclose yet another related type of honeycomb panel. The panels disclosed in the '254 and '554 patents are formed by stacking precursor tubular members one on top of another, wherein the top surface of a particular precursor tubular member is bonded to the bottom surface of the next adjacent precursor tubular member, and the bottom surface of the particular precursor tubular member is bonded to the top surface of an adjacent precursor tubular member. The stacked and bonded precursor tubular members forming a resulting thermal insulating curtain.

Various machines are also known that are capable of manufacturing cellular panels at high speed. For example, U.S. Pat. No. 4,450,027 to Colson, the disclosure of which is hereby incorporated by reference, discloses an apparatus for manufacturing cellular panels. Related U.S. Pat. No. 4,631,108 to Colson, the disclosure of which is hereby incorporated by reference, issued from a continuation-in-part of the application that eventually issued as the '027 patent.

The cellular panels manufactured heretofore by interconnecting a plurality of individual precursor tubular cells have generally comprised precursor cells constructed from a single strip of folded material. The resulting elongated precursor tubular cells of a single material are then directly joined together to form a cellular panel. The machine disclosed in the '027 patent may be used to manufacture such panels. Since the precursor tubular cells have been manufactured from single strips of material, however, it has not been possible to obtain the advantages that may be available when the honeycomb panel is constructed of more than one type of material. One such advantage is the ability to construct a cellular panel that is to be used as a window covering wherein one type of material faces inward for viewing by people inside of the room and a second, different material, faces outward. The inward facing side of the panel could be made from an aesthetically pleasing material, whereas the outward facing side could be made from a heat reflective or heat absorptive material. One side of the panel could also be made from a light-blocking material. Similarly, if an installed panel will have a hidden side, each precursor cell may be constructed to have an aesthetically pleasing material on the visible side of the resulting panel and a less expensive, less attractive material on the hidden side of the panel.

SUMMARY OF THE INVENTION

It is desirable to be able to form each precursor tubular cell in a honeycomb panel constructed by interconnecting a plurality of individual precursor tubular cells from a plurality of material types rather than from a single type of material.

Accordingly, it is an object of the disclosed invention to provide an improved retractable cover for an architectural opening.

The instant invention is an expandable and contractible honeycomb panel comprising a plurality of parallel rows of interconnected elongated precursor tubular cells, each of the precursor tubular cells being constructed of a foldable and creasable material, and each precursor tubular cell comprising at least a first strip of material and a second strip of material. The second strip of material is arranged substantially parallel to the first strip of material, and the two strips are substantially equal in length. A carrier strip joins the first strip and the second strip. The combination of the first strip, the second strip, and the carrier is shaped to form a precursor tubular cell used to construct the honeycomb panel.

A more detailed explanation of the invention is provided in the following description and claims, and is illustrated in the accompanying drawings.

DESCRIPTION OF THE PREFERRED EMBODIMENTS

Several embodiments of a cellular honeycomb panel 10 (FIG. 1E, FIG. 2E, FIG. 4E), comprising a plurality of elongated precursor tubular cells 12, each precursor cell comprising at least two different materials, are disclosed. An advantage of the instant invention over the prior art is that the first strip 14 and the second strip 16 may be of different materials. For example, Polymer film, metallized film, non-woven fabric, woven fabric, knit fabric, and the like. Thus, it is possible to make a cellular honeycomb panel 10 having a different look from its front and back sides.

Figures 1A, 1B, 2A, 2B:
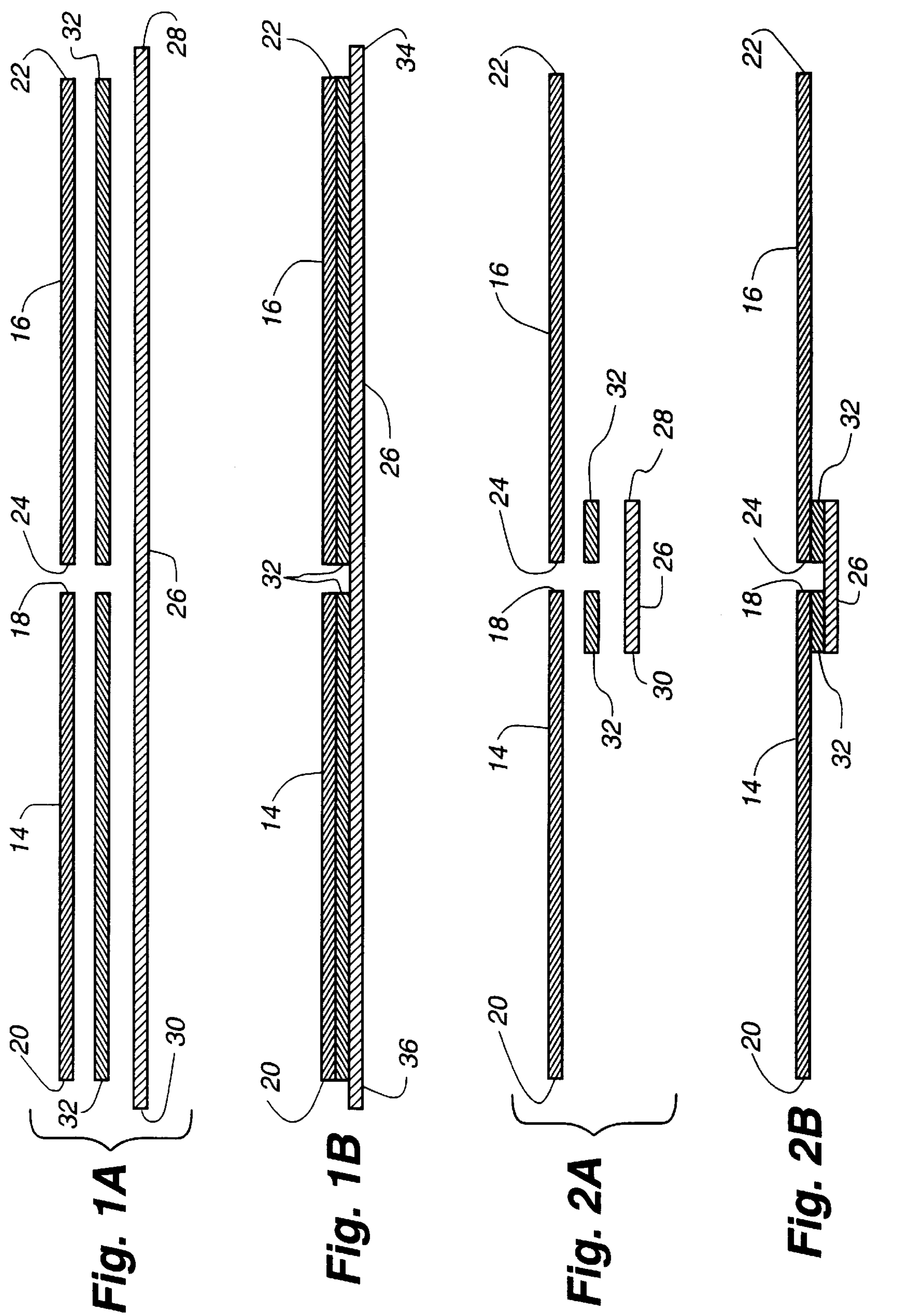
FIG. 1A is an exploded, cross-sectional view of a first embodiment of an elongated precursor tubular cell before it has been folded.
FIG. 1B is a cross-sectional view of the first embodiment of the elongated precursor tubular cell before it has been folded.
FIG. 2A is an exploded, cross-sectional view of a second embodiment of an elongated precursor tubular cell before it has been folded.
FIG. 2B is a cross-sectional view of the second embodiment of the elongated precursor tubular cell before it has been folded.

Referring first to FIGS. 1A through 1E, a first embodiment of the invention shall be described. FIG. 1A is an exploded cross-sectional view of an elongated precursor tubular cell 12 before the component parts are assembled and creased. A first strip 14 of a foldable and creasable material is laid down adjacent and substantially parallel to a second strip 16 of foldable and creasable material. The first strip 14 includes a first longitudinal edge 18 and a second longitudinal edge 20. Similarly, the second strip 16 includes a first longitudinal edge 22 and a second longitudinal edge 24. A good view of the first longitudinal edge 18 of the first strip 14 is visible in FIG. 1E. The width of the first strip is the distance between the first longitudinal edge 18 and the second longitudinal edge 20 of the first strip 14. Similarly, the width of the second strip 16 is the distance between the first longitudinal edge 22 and the second longitudinal edge 24 of the second strip 16. The length of the strips 14, 16 define the width of the resulting honeycomb panel 10.

In preparation for forming the laminate strip that will be folded into the elongated precursor tubular cell 12, a carrier strip 26 is placed below the first strip 14 and the second strip 16. This carrier strip 26 also has a first longitudinal edge 28 and a second longitudinal edge 30. The distance between the first longitudinal edge 28 and the second longitudinal edge 30 of the carrier strip 26 defines the width of the carrier strip 26. An adhesive 32 is used to bind the first strip 14 and the second strip 16 to the carrier strip 26. The adhesive 32 may be a heat-activated or other type of adhesive. An acceptable type of adhesive is aliphatic adhesive. The first strip 14 and the second strip 16 may, alternatively, be heat laminated to the carrier strip 26. Two-sided tape or some other continuous film adhesive could also be used to adhere strip 16 to the carrier strip 26. These latter types of adhesive may even be preferable in some applications as they may better inhibit fraying.

No matter what type adhesive 32 is used, the gap in the adhesive 32 depicted in FIG. 1A is not required. In other words, the adhesive 32 could form a continuous band spanning the distance between the second longitudinal edge 20 of the first strip 14 and the first longitudinal edge 22 of the second strip 16. Alternatively, several gaps could be present in the adhesive 32 as long as sufficient adhesive 32 is present to bind the first strip 14 and the second strip 16 to the carrier strip 26. This is true for each of the four embodiments described herein.

In the first embodiment, the carrier strip 26 is first laid down. Then, adhesive 32 is applied to the carrier strip 26 in the location shown in FIGS. 1A and 1B. With the carrier strip 26 and adhesive 32 in place, the first strip 14, comprising a first foldable and creasable material, is placed over the carrier strip 26 such that the adhesive 32 is between the carrier strip 26 and the first strip 14. The second strip 16 is then placed on the carrier strip 26 after being positioned as depicted in FIG. 1B. In this embodiment the first longitudinal edge 18 of the first strip 14 is adjacent to, but not in contact with, the second longitudinal edge 24 of the second strip 16. If desired, the adhesive 32 could be applied to the first and second strips 14, 16, rather than to the carrier strip 26.

In this embodiment, the width of the carrier strip 26 is greater than the combined widths of the first strip 14 and the second strip 16. In fact, in this embodiment, the carrier strip 26 is wide enough to accommodate a gap between the first strip 14 and the second strip 16, and also extend beyond the first longitudinal edge 22 of the second strip 16 and beyond the second longitudinal edge 20 of the first strip 14. As shown in FIG. 1B, the carrier strip 26 thus has a first extended portion, wing, or free edge 34 and a second extended portion, wing, or free edge 36. These extended portions 34, 36 may be used as attachment points when a plurality of elongated precursor tubular cells 12 are attached to form a honeycomb panel 10 (see FIG. 1D). Even if the carrier strip 26 were not wide enough to extend beyond the longitudinal edges 22 and 20, a honeycomb panel 10 incorporating the inventive concept of the present invention could be formed.

Figure 1C:
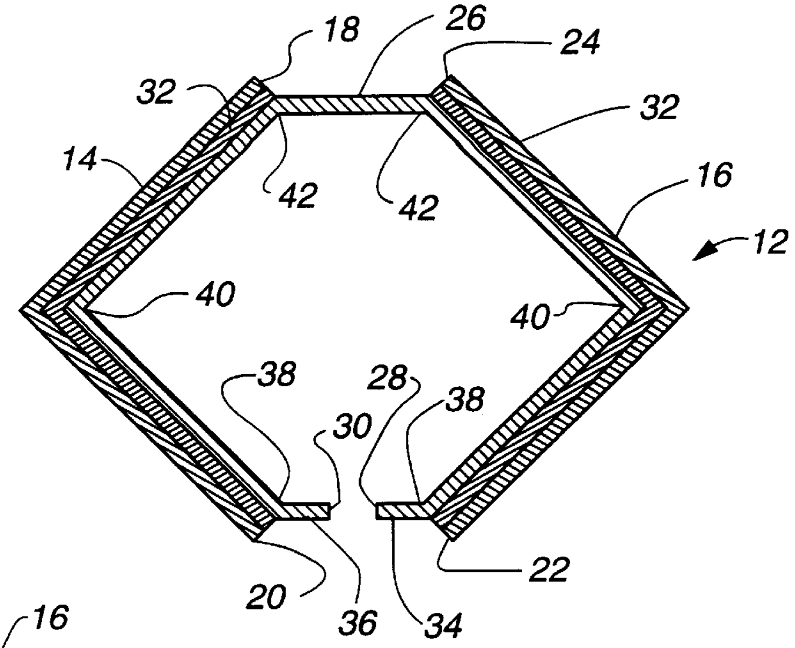
FIG. 1C is a cross-sectional view of the first embodiment of the elongated precursor tubular cell after the material has been folded.

The flat combination depicted in FIG. 1B is then folded or creased into the shape depicted in FIG. 1C, thereby forming an elongated precursor tubular cell 12. The precursor tubular cell 12 depicted in FIG. 1C is formed by making a plurality of creases in the combined material depicted in FIG. 1B. For example, a pair of first creases 38, second creases 40, and third creases 42 could be formed in the carrier strip. A first crease 38 could be formed by bending the first extended portion 34 of the carrier strip 26 at the point adjacent to where the first longitudinal edge 22 of the second strip 16 is attached to the carrier strip 26. A corresponding first crease 38 could be formed by bending the second extended portion 36 of the carrier strip 26 at the point adjacent to where second longitudinal edge 20 of the first strip 14 is attached to the carrier strip 26. If the carrier strip did not have the first extended portion 34 or the second extended portion 36 (i.e., if the lateral edges of the carrier strip 26 were even with the first longitudinal edge 22 of the second strip 16 and with the second longitudinal edge 20 of the first strip 14), a first crease 38 would be made in both the carrier strip 26 and in the first strip 14 near one longitudinal edge of the combination depicted in FIG. 1B, and a corresponding first crease 38 would be made in both the carrier strip 26 and in the second strip 16 near the other longitudinal edge of the combination.

A second crease 40 could subsequently be formed in the carrier strip 26 near the midpoint of the second strip 16, and a corresponding second crease 40 could be formed in the carrier strip 26 near the midpoint of the first strip 14. Each second crease 40 changes the shape of what will become the elongated precursor tubular cell 12 by bringing the first longitudinal edge 28 of the carrier strip 26 closer to the second longitudinal edge 30 of the carrier strip 26. Finally, a third crease 42 is made in the carrier strip 26 adjacent to the point where the second longitudinal edge 24 of the second strip 16 is attached to the carrier strip 26, and a corresponding third crease 42 is made in the carrier strip 26 adjacent to the point where the first longitudinal edge 18 of the first strip 14 is attached tone carrier strip 26. After the first, second, and third pairs of creases 38, 40, 42 have been formed, the once flat combination resembles an elongated precursor tubular cell 12.

Although the discussion of this first embodiment and of the other embodiments refers to "pleats" or "creases," the instant invention does not require them. Pleats or creases may be beneficial for some uses of the invention and are used in this disclosure for illustrative purposes, but are not required and need not be severe or well-defined.

Figure 1D:
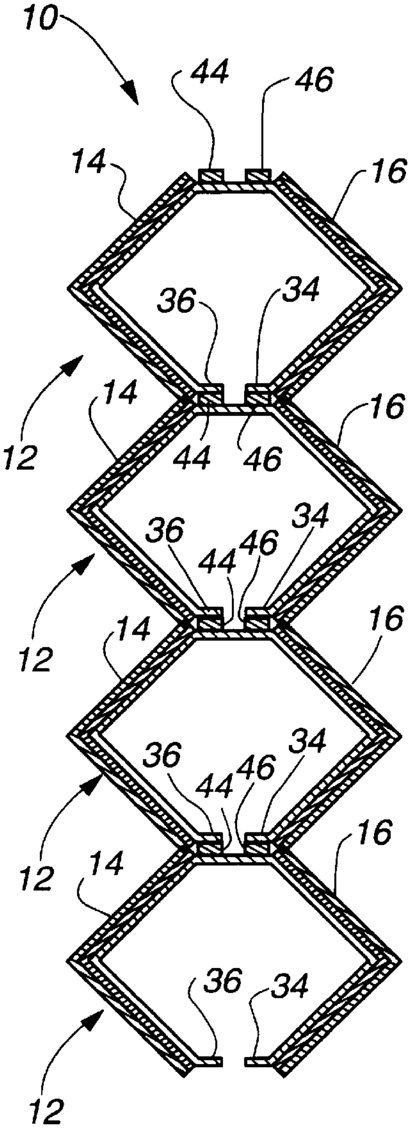
FIG. 1D is a cross-sectional view of a plurality of precursor tubular cells according to the first embodiment and forming a honeycomb panel.
Figure 1E:
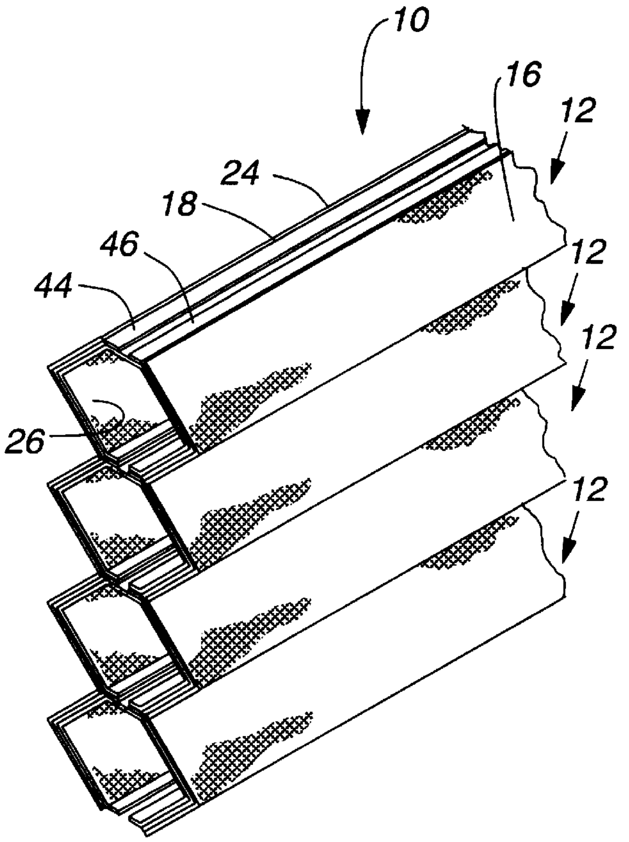
FIG. 1E is a perspective view of a portion of the honeycomb panel formed using precursor tubular cells according to the first embodiment.

The process of gluing first and second strips 14, 16 onto carrier strips 26 and creasing the resulting combination, repeated several times, produces a plurality of elongated precursor tubular cells 12 . This plurality of elongated precursor tubular cells 12 may then be connected together to form a honeycomb panel 10 (FIGS. 1D and 1E). It should be noted that in this embodiment, the creases 38, 40, 42 have been formed such that the carrier strip 26 in toward the inside of the resulting elongated precursor tubular cells 12.

FIG. 1D best depicts how a plurality of elongated precursor tubular cells 12 are combined into a single honeycomb panel 10. As seen in FIG. 1D and FIG. 1E, beads of adhesive 44, 46 are applied to the exposed exterior portion of the carrier strip 26 of one elongated precursor tubular cell 12. The extended portions 34, 36 of an adjacent elongated precursor tubular cell 12 are then attached by the adhesive beads 44, 46 to the exposed portion of the carrier strip 26 of an adjacent elongated precursor tubular cell 12. The adhesive beads 44, 46 may be made from a heat-activated or other type of adhesive. For example, the aliphatic adhesives have been used successfully in construction of honeycomb panels 10 according to the instant invention.

Referring now to FIGS. 2A through 2E, a second embodiment is described. The primary difference between this embodiment and the first embodiment described above is that, in this embodiment, the width of the carrier strip 26 is less than the combined widths of the first strip 14 and the second strip 16. Since the carrier strip 26 is not as wide as the combined widths of the first strip 14 and second strip 16, the first, second, and third creases 38, 40, 42 are not all made in the carrier strip 26 as they were in the first embodiment. As may be clearly seen in FIG. 2C, the first crease 38 is made in each of the strips 14, 16, but the carrier strip 26 does not extend to this point along the back or interior side of the first and second strips 14, 16. Thus, in this second embodiment, the first extended portion 34 comprises a portion of the second strip 16, and the second extended portion 36 comprises a portion of the first strip 14. As may be seen by comparing FIG. 2C with FIG. 1C, it is clear that the extended portions 34, 36 may comprise either a longitudinal portion of the strips 14, 16 or of the carrier strip 26.

Figure 2C:
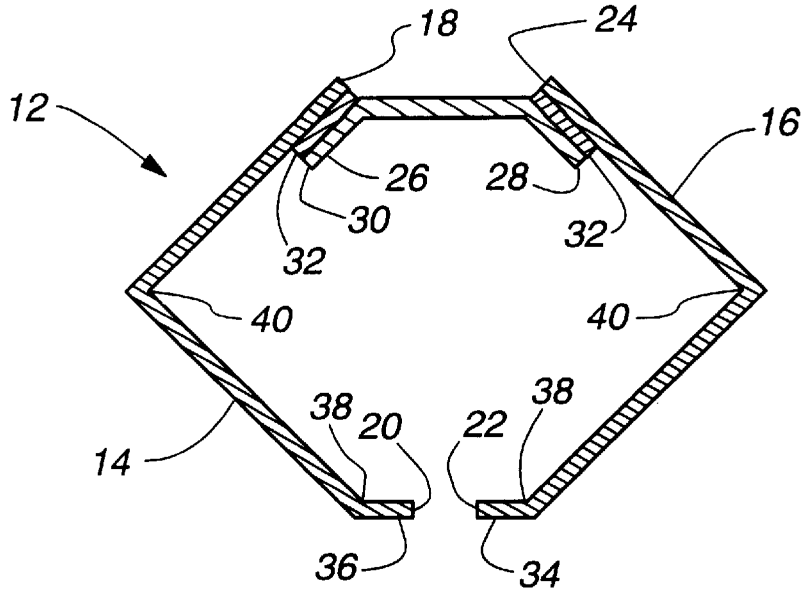
FIG. 2C is a cross-sectional view of the second embodiment of the elongated precursor tubular cell after the material has been folded.
Figure 2D:
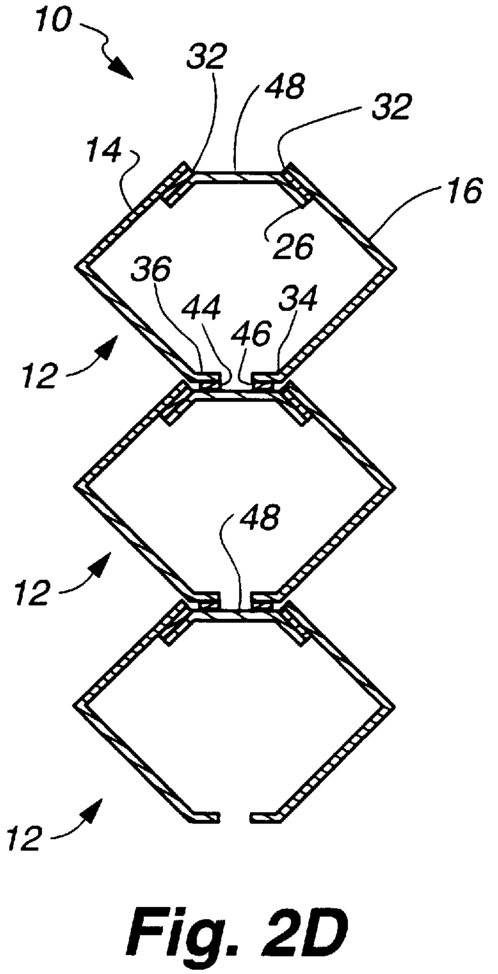
FIG. 2D is a cross-sectional view of a plurality of precursor tubular cells according to the second embodiment and forming a honeycomb panel.
Figure 2E:
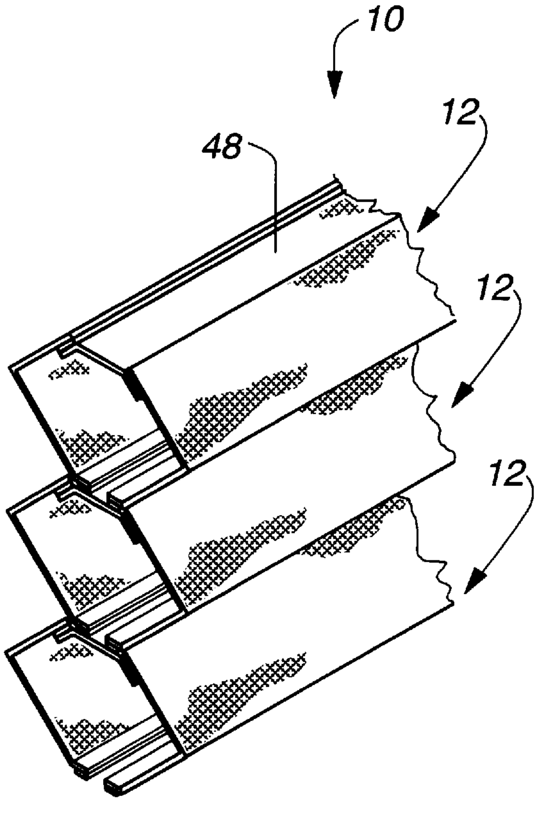
FIG. 2E is a perspective view of a portion of the honeycomb panel formed using precursor tubular cells according to the second embodiment.

Once a plurality of elongated precursor tubular cells 12 have been formed, they may be joined to form a single honeycomb panel 10 (FIG. 2D and FIG. 2E). In this embodiment the adhesive beads 44, 46 are again applied to the exposed portion 48 of the carrier strip 26. In this embodiment, however, a portion of the fabric strips 14, 16 is affixed to the exposed portion of the carrier strip 26, rather than affixing a portion of the carrier strip 26 from an adjacent elongated precursor tubular cell 12 to the exposed portion of the carrier strip 26. The exposed portion 48 of a carrier strip 26 is clearly visible in FIG. 2E.

Figure 3A:
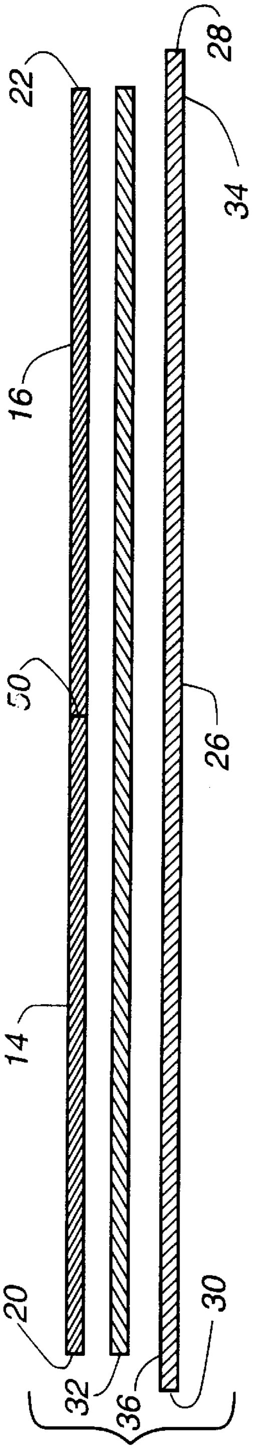
FIG. 3A is an exploded, cross-sectional view of a third embodiment of an elongated precursor tubular cell before it has been folded.
Figure 3B:
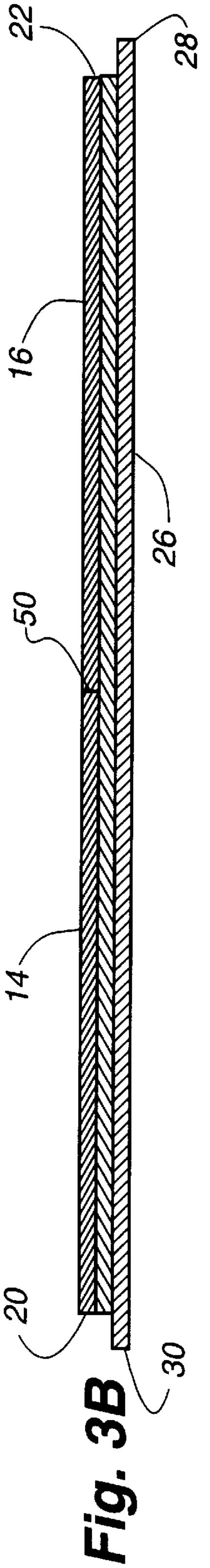
FIG. 3B is a cross-sectional view of the third embodiment of the elongated precursor tubular cell before it has been folded.
Figure 4A:
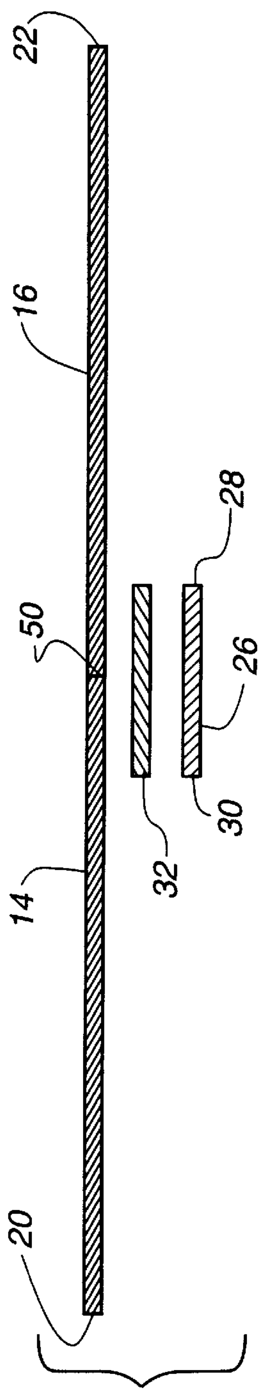
FIG. 4A is an exploded, cross-sectional view of a fourth embodiment of an elongated precursor tubular cell before it has been folded.
Figure 4B:
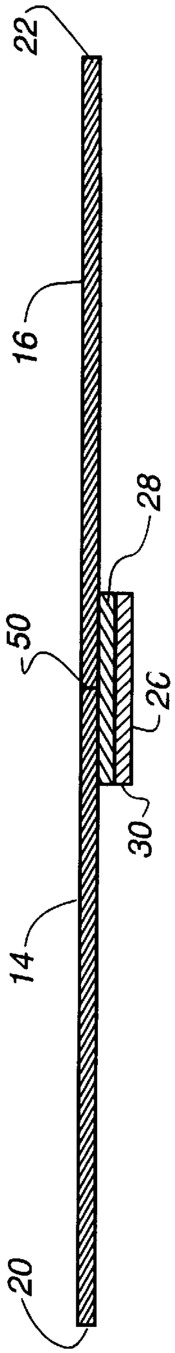
FIG. 4B is a cross-sectional view of the fourth embodiment of the elongated precursor tubular cell before it has been folded.

Referring now to FIGS. 3A through 3E, a third embodiment of the instant invention is described. This embodiment most closely resembles the embodiment depicted in FIGS. 1A through 1E. In this embodiment, the first strip 14 and the second strip 16 are placed against or contiguous with each other. In other words, the first longitudinal edge 18 of the first strip 14 touches the second longitudinal edge 24 of the second strip 16, thereby forming the seam 50 depicted in FIG. 3A. Longitudinal edges 18, 24 are not labeled in FIG. 3A but may be clearly seen in FIG. 1A. FIG. 3B is similar to FIG. 1B, but again depicts the third embodiment where the first and second strips 14, 16 are placed against each other so as to form the seam 50.

With reference to the first embodiment described above, formation of an elongated precursor tubular cell 12 was achieved by making a series of creases in the composite structure depicted in FIG. 1B. As described above, the first step toward shaping the composite structure depicted in FIG.

1B into the elongated precursor tubular cell 12 depicted in FIG. 1C involved making the first crease 38 in two places along the carrier strip 26.

Figure 3C:
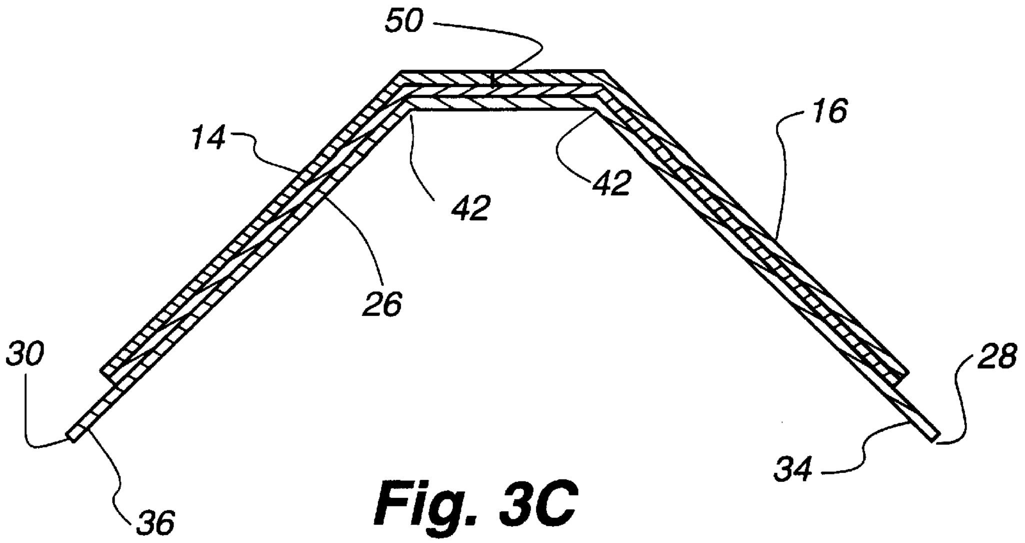
FIG. 3C is a cross-sectional view of the third embodiment of the elongated precursor tubular cell after folding of the material has been initiated.
Figure 3D:
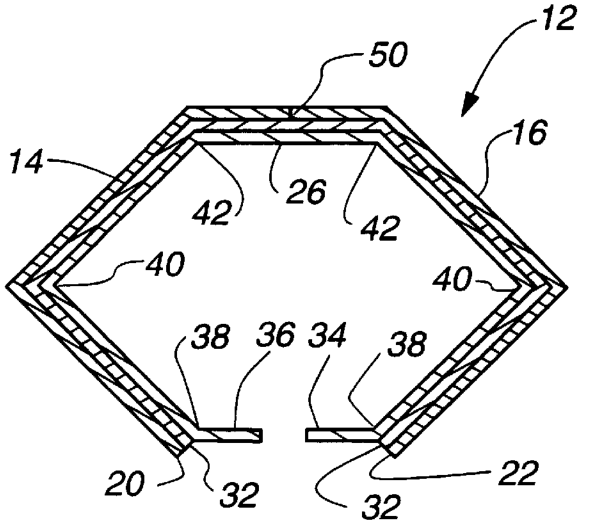
FIG. 3D is a cross-sectional view of the third embodiment of the elongated precursor tubular cell after the material has been folded.

Referring now to FIG. 3C, an alternative series of creases is depicted. FIG. 3C depicts the folding of the composite structure depicted in FIG. 3B as commencing near the center portion of the carrier strip 26 rather than near the longitudinal edges 28, 30 of the carrier strip 26. In FIG. 3C, therefore, the third crease 42 in the first strip 14 and the second strip 16 is depicted as being made first. It would be clear to someone of ordinary skill in the pertinent art that the creases could be made in any order. Also, as discussed above with references to the first embodiment, it is not required that the carrier strip 26 extend beyond the second longitudinal edge 20 of the first strip 14 or beyond the first longitudinal edge 22 of the second strip 16.

Figure 3E:
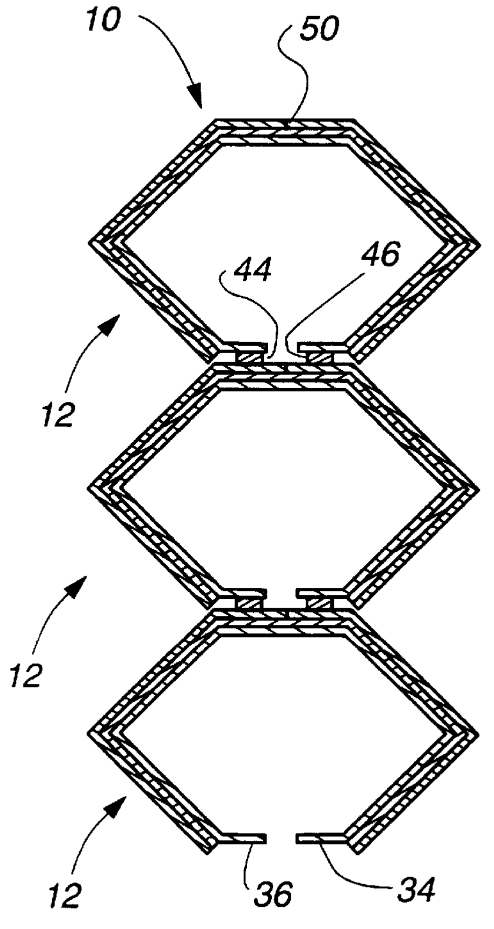
FIG. 3E is a cross-sectional view of a plurality of precursor tubular cells according to the third embodiment and forming a honeycomb panel.

Referring now to FIG. 3E, the manner in which adjacent elongated precursor tubular cells 12 are attached to form a honeycomb panel 10 is clearly depicted. FIG. 3E shows a cross-sectional view perpendicular to the plane of a resultant honeycomb panel 10. From this cross-sectional view it may clearly be seen where the adhesive beads 44, 46 are placed between adjacent elongated precursor tubular cells 12. In this embodiment, the beads 44, 46 are applied directly to the exterior surface of the first strip 14 and the second strip 16 near the seam 50. Then, an adjacent elongated precursor tubular cell 12 is attached to the adhesive beads 44, 46. In particular, the first extended portion 34 and the second extended portion 36 of the adjacent elongated precursor tubular cell 12 are placed in contact with the beads 44, 46 to attach the adjacent elongated precursor tubular cells 12.

A fourth embodiment of the instant invention is depicted in FIGS. 4A through 4E. This embodiment is most closely analogous to the embodiment depicted in FIGS. 2A through 2E. The primary difference between these two embodiments is that in the fourth embodiment the first strip 14 and the second strip 16 touch along one longitudinal edge of each strip. In particular, the second longitudinal edge 24 of the second strip 16 is in contact with the first longitudinal edge 18 of the first strip 14 along all or substantially all of the respective longitudinal edges 24, 18. This close relationship between the first strip and the second strip 16 creates a seam 50, which may be clearly seen in FIG. 4E.

Figure 4C:
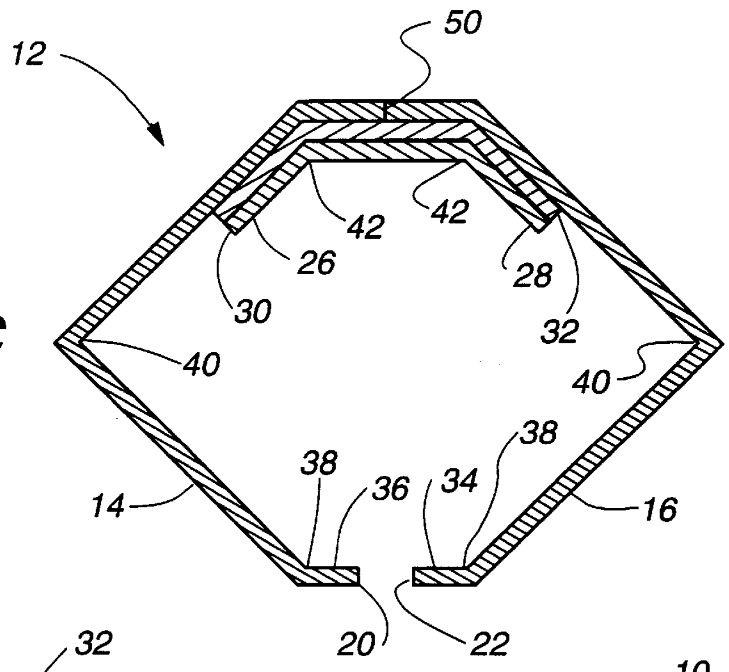
FIG. 4C is a cross-sectional view of the fourth embodiment of the elongated precursor tubular cell after the material has been folded.

The elongated precursor tubular cell 12 depicted in FIG. 4C is formed much like the precursor tubular cell 12 depicted in FIG. 2C is formed. In particular, a series of creases are formed in the composite structure depicted in FIG. 4B until the tubular configuration depicted in FIG. 4C is obtained. Once the three crease pairs 38, 40, 42 have been formed in the composite structure depicted in FIG. 4B, the carrier strip 26 is no longer visible to someone viewing one of the elongated precursor tubular cells 12 of the resultant honeycomb panel 10, since the series of folds have resulted in the carrier strips 26 being enclosed in the interior of the elongated precursor tubular cells 12. This is particularly true for this embodiment wherein the first strip 14 and the second strip 16 are placed closely together, leaving little, if any, of the carrier strip 26 visible through the seam 50.

Figure 4D:
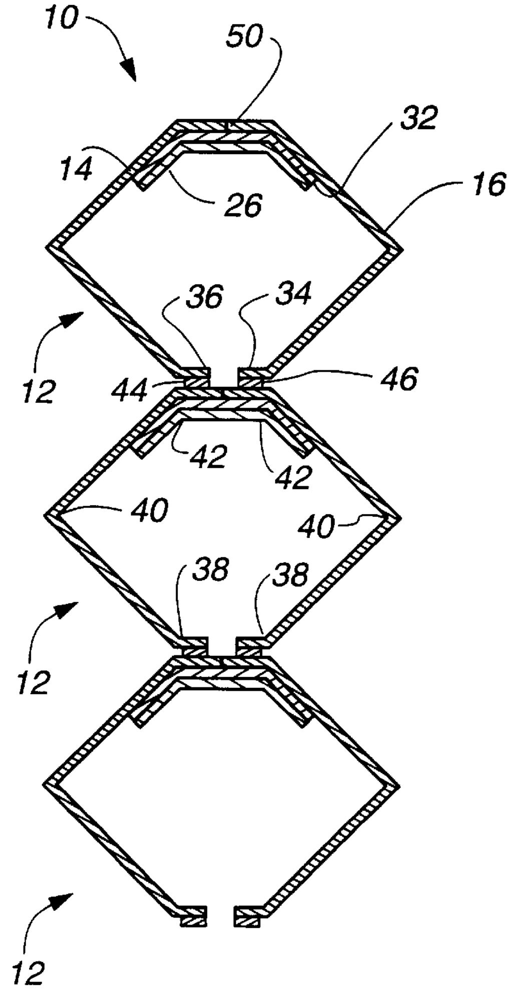
FIG. 4D is a cross-sectional view of a plurality of precursor tubular cells according to the fourth embodiment and forming a honeycomb panel.
Figure 4E:
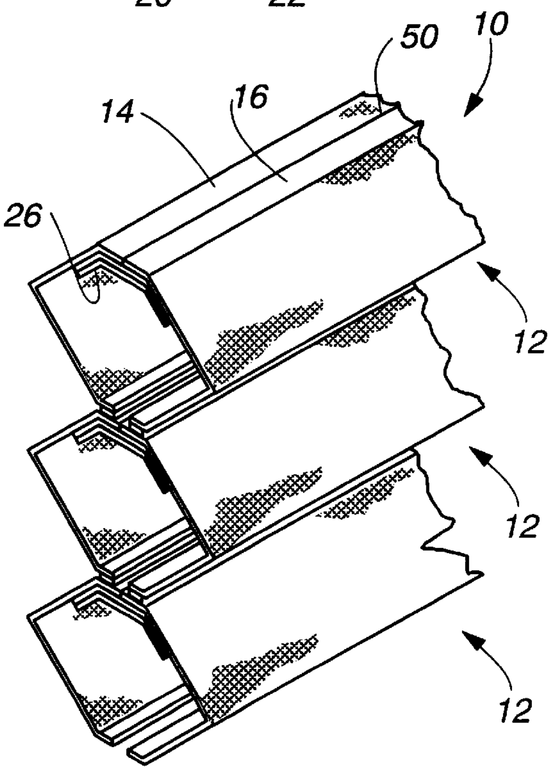
FIG. 4E is a perspective view of a portion of the honeycomb panel formed using precursor tubular cells according to the fourth embodiment.

The honeycomb panel 10 that is ultimately used as a cover for an architectural opening is formed by attaching a plurality of elongated precursor tubular cells 12 to each other as depicted in FIGS. 4D and 4E. As discussed above with regard to the previous three embodiments, two adjacent elongated precursor tubular cells 12 are attached by applying adhesive beads 44, 46 along the top portion of one elongated precursor tubular cell 12 and pressing an adjacent elongated precursor tubular cell 12 onto the adhesive beads 44, 46. In particular, the adhesive beads 44, 46 are applied in the fourth embodiment adjacent the seam 50. The adhesive bead 44 is applied to the exterior surface of the first strip 14 near the first longitudinal edge 18 of that strip. Similarly, the adhesive bead 46 is applied to the exterior surface of the second strip 16 near its second longitudinal edge 24. Once the beads of adhesive 44, 46 have been applied, the first extended portion 34 and the second extended portion 36 of an adjacent elongated precursor tubular cell 12 are forced into contact with adhesive beads 46, 44, respectively.

A particularly preferred method of making the cellular panels 10 described above is in accordance with the disclosure of U.S. Pat. No. 4,450,027, the disclosure of which has been hereby incorporated by reference. The apparatus and method disclosed in the '027 patent folds the composite material depicted in FIGS. 1B, 2B, 3B, and 4B. In other words, using the method and apparatus disclosed in the '027 patent, honeycomb panels 10 could be formed using multiple types of material for each elongated precursor tubular cell 12. The apparatus described in the '027 patent makes only one pair of creases in the material. That pair of creases corresponds to the creases 40 depicted, for example, in FIGS. 1C, 2C, 3D, and 4C. The creases 38 and the creases 42 are subordinate to the creases 40. In other words, a honeycomb panel 10 can be formed without the crease pairs 38 and 42, with only the crease pairs 40 being present. Similarly, it will be appreciated that, although pleats or creases may be preferred, they are not necessary; and the scope of the invention should be interpreted to incorporate uncreased structures and partially creased structures. This is true for each of the four embodiments described herein. Additionally, a hexagonal structure is shown, but any shape of structure is contemplated.

Although four embodiments of this invention have been described above, those skilled in the art could make numerous alterations to the disclosed embodiments without departing from the spirit or scope of this invention. For example, although the first strip 14 and second strip 16 in each of the embodiments are approximately the same width, this need not be the case. An important feature in this invention is that different types of material may be united using a carrier strip 26 to form one or more of the individual, elongated precursor tubular cells 12 that are subsequently interconnected to form the resultant honeycomb panel 10. For example, an aesthetically pleasing fabric may be used as the first strip 14, which, in the resulting honeycomb panel 10, would face toward the interior of a room. A less expensive fabric could be used for the second strip 16 if this second strip 16 is not in plain view of someone observing the resultant honeycomb panel 10 in position over an architectural opening. Also, although the honeycomb panel 10 depicted in the figures is oriented such that it expands and contracts vertically, it could be hung such that it would expand and contract horizontally without departing from the scope of this invention. It is intended that all matter contained in the above description or shown in the accompanying drawings shall be interpreted as illustrative only and not limiting.

I claim:

1. An expandable and contractible honeycomb panel comprising a plurality of parallel rows of elongated precursor tubular cells, each of said precursor tubular cells being constructed of a foldable and creasable material, each precursor tubular cell comprising a first strip of material having a first length;

a second strip of material having a second length, said second strip of material being arranged substantially parallel to said first strip of material, and said second length being substantially equal to said first length;

a carrier strip, joining said first strip and said second strip; and wherein the combination of said first strip, said second strip, and said carrier strip is shaped to form said precursor tubular cell.

2. The honeycomb panel of claim 1, wherein, for each precursor tubular cell, a first longitudinal edge of said first strip of material is touching a second longitudinal edge of said second strip of material along substantially the full length of said precursor tubular cell.

3. The honeycomb panel of claim 1 or 2, wherein said first strip of material has a first width, said second strip of material has a second width, and said carrier strip has a third width, and further wherein, for each precursor tubular cell, said third width is wider than the combination of said first width and said second width.

4. The honeycomb panel of claim 1 or 2, wherein said first strip of material has a first width, said second strip of material has a second width, and said carrier strip has a third width, and further wherein, for each precursor tubular cell, the combination of said first width and said second width is wider than said third width.

5. The honeycomb panel of claim 1 or 2, wherein said first strip of material has a first width and said second strip of material has a second width, and further wherein, for each precursor tubular cell, said second width is substantially equal to said first width.

6. The honeycomb panel of claim 3, wherein, for each precursor tubular cell, said second width is substantially equal to said first width.

7. The honeycomb panel of claim 4, wherein, for each precursor tubular cell, said second width is substantially equal to said first width.

8. The honeycomb panel of claim 1, wherein said first strip of material and said second strip of material are selected from the group consisting of polymer film, metallized fabric, nonwoven fabric, woven fabric, and knit fabric.

9. The honeycomb panel of claim 8, wherein said carrier strip is selected from the group consisting of a thermo plastic film and a polyurethane film.

10. An expandable and contractible honeycomb panel comprising:

a first elongated precursor tubular cell comprising:

a first strip of a first foldable and creasable material, said first strip having a first length;

a second strip of a second foldable and creasable material, said second strip having a second length, said second strip of material being arranged substantially parallel to said first strip of material, and said second length being substantially equal to said first length; and a first carrier strip, joining said first strip and said second strip, wherein the combination of said first strip, said second strip, and said first carrier strip is shaped to form said first elongated precursor tubular cell; and a second elongated precursor tubular cell arranged substantially parallel to said first elongated precursor tubular cell and adjoined on top thereof, said second elongated precursor tubular cell comprising a third strip of a third foldable and creasable material, said third strip having a third length substantially equal to said first length;

a fourth strip of a fourth foldable and creasable material, said fourth strip having a fourth length substantially equal to said first length, said fourth strip of material being arranged substantially parallel to said third strip of material; and a second carrier strip, joining said third strip and said fourth strip, wherein the combination of said third strip, said fourth strip, and said second carrier strip is shaped to form said second elongated precursor tubular cell.

11. The honeycomb panel of claim 10, wherein said first foldable and creasable material is different from at least one of said third foldable and creasable material and said fourth foldable and creasable material.

12. The honeycomb panel of claim 10 or 11, wherein said first, second, third, and fourth strips of material are selected from the group consisting of polymer film, metallized fabric, nonwoven fabric, woven fabric, and knit fabric.

13. The honeycomb panel of claim 12, wherein said first and second carrier strips are selected from the group consisting of a thermo plastic film and a polyurethane film.

14. The honeycomb panel of claim 10, wherein said first and third strips of material each has a first width, said second and fourth strips of material each has a second width, and said first and second carrier strips each has a third width, and further wherein, for each precursor tubular cell, said third width is wider than the combination of said first width and said second width.

15. The honeycomb panel of claim 14, wherein said first carrier strip comprises a first longitudinal edge including a second extended portion; and a second longitudinal edge including a first extended portion, and wherein said extended portions of said first carrier strip are adjoined to said second carrier strip.

16. The honeycomb panel of claim 14, wherein said first carrier strip comprises a first longitudinal edge including a second extended portion; and a second longitudinal edge including a first extended portion, and wherein said second extended portion of said first carrier strip is adjoined to said third strip, and further wherein said first extended portion of said first carrier strip is adjoined to said fourth strip.

17. The honeycomb panel of claim 10, wherein said first and second strips of material each has a first width, said second and fourth strips of material each has a second width, and said first and second carrier strips each has a third width, and further wherein, for each precursor tubular cell, the combination of said first width and said second width is wider than said third width.

18. The honeycomb panel of claim 17, wherein said first strip comprises a second longitudinal edge including a second extended portion, wherein said second strip comprises a first longitudinal edge including a first extended portion, and further wherein said respective extended portions of said first and second strips are adjoined to said second carrier strip.

19. The honeycomb panel of claim 17, wherein said first strip comprises a second longitudinal edge including a second extended portion, wherein said second strip comprises a first longitudinal edge including a first extended portion, and wherein said second extended portion of said first strip is adjoined to said third strip, and further wherein said first extended portion of said second strip is adjoined to said fourth strip.

20. The honeycomb panel of any one of claims 14–19, wherein said first foldable and creasable material is different from at least one of said third foldable and creasable material and said fourth foldable and creasable material.

21. The honeycomb panel of claim 20, wherein said first, second, third, and fourth strips of material are selected from the group consisting of polymer film, metallized fabric, nonwoven fabric, woven fabric, and knit fabric.

22. The honeycomb panel of claim 21, wherein said first and second carrier strips are selected from the group consisting of a thermo plastic film and a polyurethane film.

* * * * *

UNITED STATES PATENT AND TRADEMARK OFFICE

CERTIFICATE OF CORRECTION

PATENT NO. : 6,103,336
APPLICATION NO. : 09/014460
DATED : August 15, 2000
INVENTOR(S) : Paul G. Swiszcz It is certified that error appears in the above-identified patent and that said Letters Patent is hereby corrected as shown below:

In claim 35, line 1, remove “25” and substitute therefor --23--.

Signed and Sealed this

Twenty-first Day of April, 2009

JOHN DOLL
*Acting Director of the United States Patent and Trademark Office*

UNITED STATES PATENT AND TRADEMARK OFFICE

CERTIFICATE OF CORRECTION

PATENT NO. : 6,103,336 C1
APPLICATION NO. : 90/008311
DATED : March 3, 2009
INVENTOR(S) : Paul G. Swiszcz It is certified that error appears in the above-identified patent and that said Letters Patent is hereby corrected as shown below:

In claim 35, line 1, remove "25" and substitute therefor --23--.

This certificate supersedes the Certificate of Correction issued April 21, 2009.

Signed and Sealed this

Nineteenth Day of May, 2009

JOHN DOLL
*Acting Director of the United States Patent and Trademark Office*

UNITED STATES PATENT AND TRADEMARK OFFICE

CERTIFICATE OF CORRECTION

PATENT NO. : 6,103,336 C1

APPLICATION NO. : 90/008311

DATED : March 3, 2009

INVENTOR(S) : Paul G. Swiszcz

It is certified that error appears in the above-identified patent and that said Letters Patent is hereby corrected as shown below:

Column 2, in claim 35, line 61, remove "25" and substitute therefor --23--.

This certificate supersedes the Certificates of Correction issued April 21, 2009 and May 19, 2009.

Signed and Sealed this

Sixteenth Day of June, 2009

JOHN DOLL

*Acting Director of the United States Patent and Trademark Office*

US006103336C1

(12) EX PARTE REEXAMINATION CERTIFICATE (6687th)

United States Patent

Swiszcz

(10) Number: US 6,103,336 C1

(45) Certificate Issued: Mar. 3, 2009

(54) LAMINATE HONEYCOMB MATERIAL

(75) Inventor: Paul G. Swiszcz, Boulder, CO (US)

(73) Assignee: Hunter Douglas Inc., Upper Saddle River, NJ (US)

Reexamination Request:
No. 90/008,311, Oct. 31, 2006

Reexamination Certificate for:

| | |
|---|---|
| Patent No.: | **6,103,336** |
| Issued: | **Aug. 15, 2000** |
| Appl. No.: | **09/014,460** |
| Filed: | **Jan. 28, 1998** |

(51) Int. Cl.

| | |
|---|---|
| ***B31D 3/00*** | (2006.01) |
| ***B31D 3/02*** | (2006.01) |

(52) U.S. Cl. ........................ 428/116; 428/118; 428/112; 160/84.01; 160/84.05

(58) Field of Classification Search ........................ None
See application file for complete search history.

(56) References Cited

U.S. PATENT DOCUMENTS 5,888,639 A 3/1999 Green et al.

*Primary Examiner*—Stephen J Stein

(57) ABSTRACT

A colinear laminate honeycomb panel permits the use of two or more different materials to form a single panel. In this manner, a retractable cover for an architectural opening may be formed that has a different appearance depending upon which side of the panel is being viewed. The resultant panel is formed by attaching a plurality of elongated precursor tubular cells, wherein each precursor tubular cell itself comprises at least two strips of material held in proximity to one another by a common carrier strip.

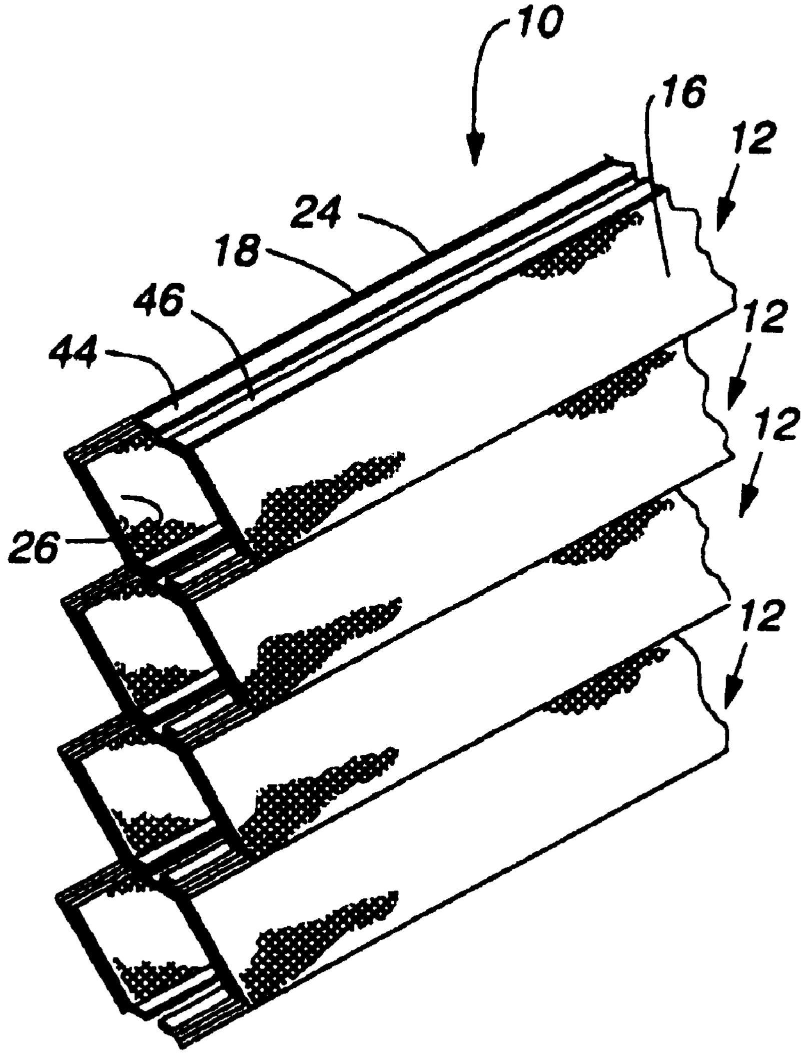

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 10 are cancelled.

New claims 23–48 are added and determined to be patentable.

Claims 2–9 and 11–22 were not reexamined.

*23. An expandable and contractible honeycomb panel comprising a plurality of parallel rows of elongated precursor tubular cells, each of said precursor tubular cells being constructed of a foldable and creasable material, each precursor tubular cell comprising*

*a first strip of material having a first length;*

*a second strip of material having a second length, said second strip of material being arranged substantially parallel to said first strip of material, and said second length being substantially equal to said first length; and*

*a carrier strip, joining said first strip and said second strip;*

*wherein the combination of said first strip, said second strip, and said carrier strip is shaped to form said precursor tubular cell; and*

*wherein each precursor tubular cell is shaped to allow said precursor tubular cell to contract into a flat shape and to allow each contracted precursor tubular cell to stack on the other contracted precursor tubular cells.*

*24. An expandable and contractible honeycomb panel comprising:*

*a first elongated precursor tubular cell comprising:*

*a first strip of a first foldable and creasable material, said first strip having a first length;*

*a second strip of a second foldable and creasable material, said second strip having a second length, said second strip of material being arranged substantially parallel to said first strip of material, and said second length being substantially equal to said first length; and*

*a first carrier strip, joining said first strip and said second strip,*

*wherein the combination of said first strip, said second strip, and said first carrier strip is shaped to form said first elongated precursor tubular cell; and*

*a second elongated precursor tubular cell arranged substantially parallel to said first elongated precursor tubular cell and adjoined on top thereof, said second elongated precursor tubular cell comprising*

*a third strip of a third foldable and creasable material, said third strip having a third length substantially equal to said first length;*

*a fourth strip of a fourth foldable and creasable material, said fourth strip having a fourth length substantially equal to said first length, said fourth strip of material being arranged substantially parallel to said third strip of material; and*

*a second carrier strip, joining said third strip and said fourth strip,*

*wherein the combination of said third strip, said fourth strip, and said second carrier strip is shaped to form said second elongated precursor tubular cell,*

*wherein the first and second elongated precursor tubular cells are shaped to allow said cells to contract into flat shapes and to allow the first contracted elongated precursor tubular cell to stack on the second contracted elongated precursor tubular cell.*

*25. The honeycomb panel of claim 23 wherein at least a portion of said carrier strip is located at the top of said precursor tubular cell.*

*26. The honeycomb panel of claim 24 wherein at least a portion of said first carrier strip is located at the top of said first elongated precursor tubular cell; and*

*wherein at least a portion of said second carrier strip is located at the top of said second elongated precursor tubular cell.*

*27. The honeycomb panel of claim 23 wherein said first and second strips each have a lengthwise crease near the midpoints thereof extending for said first and second lengths, respectively.*

*28. The honeycomb panel of claim 24 wherein said first and second strips each have a lengthwise crease near the midpoints thereof extending for said first and second lengths, respectively; and*

*wherein said third and fourth strips each have a lengthwise crease near the midpoints thereof extending for said third and fourth lengths, respectively.*

*29. The honeycomb panel of claim 23, wherein, for each precursor tubular cell, a first longitudinal edge of said first strip of material is touching a second longitudinal edge of said second strip of material along substantially the full length of said precursor tubular cell.*

*30. The honeycomb panel of claim 23, wherein said first strip of material has a first width, said second strip of material has a second width, and said carrier strip has a third width, and further wherein, for each precursor tubular cell, said third width is wider than the combination of said first width and said second width.*

*31. The honeycomb panel of claim 23, wherein said first strip of material has a first width, said second strip of material has a second width, and said carrier strip has third width, and further wherein, for each precursor tubular cell, the combination of said first width and said second width is wider than said third width.*

*32. The honeycomb panel of claim 23, wherein said first strip of material has a first width and said second strip of material has a second width, and further wherein, for each precursor tubular cell, said second width is substantially equal to said first width.*

*33. The honeycomb panel of claim 30, wherein, for each precursor tubular cell, said second width is substantially equal to said first width.*

*34. The honeycomb panel of claim 31, wherein, for each precursor tubular cell, said second width is substantially equal to said first width.*

*35. The honeycomb panel of claim 25, wherein said first strip of material and said second strip of material are selected from the group consisting of polymer film, metallized fabric, nonwoven fabric, woven fabric, and knit fabric.*

*36. The honeycomb panel of claim 35, wherein said carrier strip is selected from the group consisting of a thermo plastic film and a polyurethane film.*

*37. The honeycomb panel of claim 24, wherein said first foldable and creasable material is different from at least one of said third foldable and creasable material and said fourth foldable and creasable material.*

*38. The honeycomb panel of claim 24, wherein said first, second, third, and fourth strips of material are selected from the group consisting of polymer film, metallized fabric, non-woven fabric, woven fabric, and knit fabric.*

*39. The honeycomb panel of claim 38, wherein said first and second carrier strips are selected from the group consisting of a thermo plastic film and a polyurethane film.*

*40. The honeycomb panel of claim 24, wherein, said first and third strips of material each has a first width, said second and fourth strips of material each has a second width, and said first and second carrier strips each has a third width, and further wherein, for each precursor tubular cell, said third width is wider than the combination of said first width and said second width.*

*41. The honeycomb panel of claim 40, wherein said first carrier strip comprises a first longitudinal edge including a second extended portion; and*

*a second longitudinal edge including a first extended portion, and wherein said extended portions of said first carrier strip are adjoined to said second carrier strip.*

*42. The honeycomb panel of claim 40, wherein said first carrier strip comprises a first longitudinal edge including a second extended portion; and*

*a second longitudinal edge including a first extended portion, and wherein said second extended portion of said first carrier strip is adjoined to said third strip, and further wherein said first extended portion of said first carrier strip is adjoined to said fourth strip.*

*43. The honeycomb panel of claim 24, wherein said first and third strips of material each has a first width, said second and fourth strips of material each has a second width, and said first and second carrier strips each has a third width, and further wherein, for each precursor tubular cell, the combination of said first width and said second width is wider than said third width.*

*44. The honeycomb panel of claim 43, wherein said first strip comprises a second longitudinal edge including a second extended portion, wherein said second strip comprises a first longitudinal edge including a first extended portion, and further wherein said respective extended portions of said first and second strips are adjoined to said second carrier strip.*

*45. The honeycomb panel of claim 43, wherein said first strip comprises a second longitudinal edge including a second extended portion, wherein said second strip comprises a first longitudinal edge including a first extended portion, and wherein said second extended portion of said first strip is adjoined to said third strip, and further wherein said first extended portion of said second strip is adjoined to said fourth strip.*

*46. The honeycomb panel of any one of claims 40 to 45, wherein said first foldable and creasable material is different from at least one of said third foldable and creasable material and said fourth foldable and creasable material.*

*47. The honeycomb panel of claim 46, wherein said first, second, third, and fourth strips of material are selected from the group consisting of polymer film, metallized fabric, non-woven fabric, woven fabric, and knit fabric.*

*48. The honeycomb panel of claim 47, wherein said first and second carrier strips are selected from the group consisting of a thermo plastic film and a polyurethane film.*

* * * * *